United States Patent [19]

Abrams et al.

[11] Patent Number: 4,814,503
[45] Date of Patent: Mar. 21, 1989

[54] ZEOLITE RHO AND ZK-5 CATALYSTS FOR CONVERSION OF METHANOL AND AMMONIA TO DIMETHYLAMINE

[75] Inventors: Lloyd Abrams, Hockessin, Del.; David R. Corbin, West Chester; Robert D. Shannon, Chadds Ford, both of Pa.

[73] Assignee: E. I. Du Pont de Nemours and Company, Wilmington, Del.

[21] Appl. No.: 879,444

[22] Filed: Jun. 27, 1986

[51] Int. Cl.$^4$ .................. C07C 85/02; C07C 85/06
[52] U.S. Cl. .................. 564/474; 564/479; 423/328; 423/329
[58] Field of Search .................. 564/474, 479

[56] References Cited

U.S. PATENT DOCUMENTS

| | | | |
|---|---|---|---|
| Re. 19,632 | 7/1935 | Arnold | 260/127 |
| 1,926,691 | 9/1933 | Swallen et al. | 260/127 |
| 1,992,935 | 3/1935 | Arnold | 260/127 |
| 2,349,222 | 5/1944 | Goshorn | 260/585 |
| 2,394,515 | 2/1946 | Goshorn | 260/583 |
| 2,394,516 | 2/1946 | Goshorn | 260/583 |
| 2,456,599 | 12/1948 | Smith | 260/585 |
| 3,278,598 | 10/1966 | Markiewitz | 260/563 |
| 3,384,667 | 5/1968 | Hamilton | 260/585 |
| 3,387,032 | 6/1968 | Leonard | 260/585 |
| 3,493,519 | 2/1970 | Kerr et al. | 252/455 |
| 3,506,400 | 4/1970 | Eberly et al. | |
| 3,904,738 | 9/1975 | Robson | |
| 4,082,805 | 4/1978 | Kaeding | 260/585 |
| 4,191,709 | 3/1980 | Parker et al. | 260/583 |
| 4,254,061 | 3/1981 | Weigert | 564/479 |
| 4,313,003 | 1/1982 | Weigert | 564/463 |
| 4,326,994 | 4/1982 | Haag et al. | 252/455 Z |
| 4,393,265 | 7/1983 | Bonifaz | 585/639 |
| 4,398,041 | 8/1983 | Cochran et al. | 564/479 |
| 4,434,300 | 2/1984 | Deeba et al. | 564/479 |
| 4,436,938 | 3/1984 | Tompsett | 564/474 |
| 4,485,261 | 11/1984 | Ashina et al. | 564/479 |
| 4,582,936 | 4/1986 | Ashina et al. | 564/479 |
| 4,602,112 | 7/1986 | Gier et al. | 564/479 |
| 4,683,334 | 7/1987 | Bergna et al. | 564/474 |

FOREIGN PATENT DOCUMENTS

| | | |
|---|---|---|
| 0085408 | 8/1983 | European Pat. Off. |
| 0130407 | 1/1985 | European Pat. Off. |
| 56-53887 | 10/1982 | Japan |
| 422563 | 1/1935 | United Kingdom |
| 2013660 | 8/1979 | United Kingdom |

OTHER PUBLICATIONS

A. I. Ch. E. Journal, 12:292, (1966), Restelli et al., "Transmethylation Reactions of Monomethyl and Dimethylamine over Montmorillonite in a Flow System".

Journal of Catalysis, 82:313, (1981), Mochida et al., "Selective Synthesis of Dimethylamine (DMA) from Methanol and Ammonia over Zeolites".

*Primary Examiner*—Glennon H. Hollrah
*Assistant Examiner*—Susan Treaner

[57] ABSTRACT

Improved acidic zeolite rho and ZK-5 catalysts for conversion of methanol and ammonia to dimethylamine are disclosed. The acidic zeolite rho catalyst is prepared by calcining zeolite $NH_4$-rho or H-rho in the presence of steam. The acidic zeolite ZK-5 catalyst is prepared by calcining zeolite $NH_4$-ZK-5 or H-ZK-5 in the presence of steam. An acidic zeolite rho which has been prepared by calcining zeolite $NH_4$-rho in a vertical furnace in the presence of ammonia is disclosed. Processes for producing dimethylamine with the specified catalysts are also disclosed.

23 Claims, No Drawings

ZEOLITE RHO AND ZK-5 CATALYSTS FOR CONVERSION OF METHANOL AND AMMONIA TO DIMETHYLAMINE

BACKGROUND OF THE INVENTION

1. Field of the Invention

This invention involves a process for making amines, particularly dimethylamine, in which methanol and/or dimethylether and ammonia are contacted in the presence of a zeolite catalyst.

2. Background

Methylamines are generally prepared in industrial quantities by continuous reaction of methanol and ammonia in the presence of a silica-alumina catalyst. The reactants are typically combined in the vapor phase, at temperatures in the range of 300° C. to 500° C., and at elevated pressures. Trimethylamine is the principal component of the resulting product stream, accompanied by lesser amounts of monomethylamine and dimethylamine. From a commercial standpoint, the most valued product of the reaction is dimethylamine, in view of its widespread industrial use as a chemical intermediate. Accordingly, a major objective of those seeking to enhance the commercial efficiency of this process has been to improve overall yields of dimethylamine, and to a lesser extent, monomethylamine, relative to trimethylamine. Among the approaches taken to meet this objective are recycling of trimethylamine, adjustment of the ratio of methanol to ammonia reactants, and use of selected dehydrating or aminating catalyst species. Due to the commercial importance of the process, a rather extensive compendium of patents and other contributions to the technical literature has resulted. Representative references generally relevant to the field of the present invention are summarized in the following paragraphs.

Swallen, U.S. Pat. No. 1,926,691, discloses a process for producing dimethylamine by disproprotionating monomethylamine over dehydrating or aminating catalysts such as alumina, silica, thoria, aluminum silicate or partially dehydrated aluminum trihydrate.

Arnold, U.S. Pat. No. 1,992,935, describes a process for catalytic synthesis of amines from alcohols and ammonia which employs as catalyst a dehydrating oxide, e.g., alumina, deposited on the surface of a porous, rigid gel, e.g., silica gel. Arnold, U.S. Pat. No. Re. 19,632, discloses a process improvement in which trimethylamine is introduced with the methanol and ammonia reactants to shift reaction equilibrium in favor of dimethylamine production.

Johnson, British Pat. No. 422,563, discloses a process for producing aliphatic amines involving heating an alcohol or ether under a pressure of more than about 50 atmospheres in the presence of a "catalyst capable of splitting off water" (e.g., alumina), with an excess of ammonia and optionally with addition of primary amine to the reaction mixture.

Goshorn, U.S. Pat. No. 2,349,222, discloses use of granular alumina coated with one or more oxides of nickel, cobalt, or chromium as a catalyst for alkylation of ammonia to produce alkyl amines. Goshorn, U.S. Pat. Nos. 2,394,515 and 2,394,516, discloses use as catalyst or an aluminum salt or oxide coated with silica and vanadium or molybdenum oxide.

Smith, U.S. Pat. No. 2,456,599, discloses a process improvement wherein water is added to a reactant feed mixture of methanol and ammonia to repress formation of tertiary amine in favor of primary and secondary amine.

Markiewitz, U.S. Pat. No. 3,278,598, discloses use of a rhodium, palladium, or ruthenium cocatalyst in conjunction with Raney metals to increase production of secondary amines from the reaction of alcohols and ammonia.

Rostelli et al., A. I. Ch. E. Journal 12:292 (1966) describe studies of transmethylation reactions of monomethylamine and dimethylamine over montmorillonite, a hydrated magnesium or calcium oxide-containing aluminosilicate having a porous lattice structure. For transmethylation of monomethylamine, this work indicated that reaction rate was directly proportional to reactant partial pressure, indicating that the rate-determining event is adsorption of reactant to the catalyst surface.

Hamilton, U.S. Pat. No. 3,384,667, describes alkylation of ammonia in the presence of a dehydrated crystalline aliminosilicate catalyst having pores of a diameter permitting absorption of primary and secondary, but not tertiary, amine products.

Leonard, U.S. Pat. No. 3,387,032, discloses a process for reacting ammonia with methanol and/or dimethyl ether in the presence of a catalyst consisting of a silica gel base impregnated with 10-15% alumina which is first steam-deactivated and then treated with silver, rhenium, molybdenum, or cobalt ions to promote selectivity for dimethylamine.

Kaeding, U.S. Pat. No. 4,082,805, discloses use of a crystalline aluminosilicate or zeolite catalyst having the structure of ZSM-5, ZSM-11 or ZSM-21 in a process for producing amines by reaction of ammonia with $C_1$-$C_5$ alcohols at elevated temperatures and pressures.

Parker et al., U.S. Pat. No. 4,191,709, describe use of a hydrogen form of zeolite FU-1 or zeolite FU-1 in which some or all of the protons have been replaced by bivalent or trivalent cations.

Weigert, U.S. Pat. No. 4,254,061, discloses a process in which production of monomethylamine is enhanced by reacting methanol and ammonia in amounts sufficient to provide a C/N ratio of 0.5 to 1.5 over a catalyst selected from (a) mordenite wherein the primary cation is Li, Na, HNa having at least 2% Na by weight, K, Ca, Sr, Ba, Ce, Zn or Cr;

(b) ferrierite wherein the primary metal cation is Li, Na, K, Ca, Sr, Ba, Ce or Fe;

(c) erionite ore;

(d) calcium erionite, and (e) clinoptilolite ore;

at a temperature of 250°-475° C. and a pressure of 7-7000 kPa, a contact time, normalized to 7 kPa, or 0.1 to 60 seconds, and a methanol conversion of 15-95%.

Ashina et al., Japanese published patent application No. 56-53887, and Mochida et al., Journal of Catalysis 82:313 (1981), also disclose use of mordenite zeolites to enhance production of dimethylamine in closely related variants of the process disclosed by Weigert.

Weigert, U.S. Pat. No. 4,313,003, discloses an improved process for disproportionating monomethylamine to dimethylamine and ammonia, comprising passing monomethylamine over a crystalline aluminosilicate catalyst selected from (a) mordenite wherein the primary cation is Na, HNa having at least 2% Na, Mg, Ca, Sr or Ba'

(b) ferrierite wherein the primary metal cataion is Na, K, Mg, Ca, Sr or Ba;
(c) clinoptilolite and
(d) phillipsite;

at a temperature of 250°–475° C. and a pressure of 7-7000 kPa, at a feed rate of 0.1–10 grams of monomethylamine per gram of catalyst per hour, at a monomethylamine conversion of 15–75%.

Cochran et al., U.S. Pat. No. 3,498,041, describe a process for converting $C_1$–$C_4$ alcohols to a non-equilibrium controlled distribution of primary, secondary, and tertiary alkylamines. The process disclosed involved passing a mixture of reactant alcohols and ammonia into a first conversion zone containing a "shape-selective" crystalline aluminosilicate catalyst having a pore siz selective for mono and disubstituted alkylamine products; dividing the resulting product stream; passing one portion of this product stream to a second conversion zone containing another catalyst having a different pore size distribution; and combining the remaining portion of the first product stream with the product stream of the second conversion zone to yield a non-equilibrium controlled product distribution. The zeolite catalysts disclosed by this reference include 5A zeolite, REY zeolite, H-chabazite-erionite, H-erionite, H-mordenite, and H-Y zeolite. Deeba et al., published European patent application 0085408, disclose a method for improving methanol conversion rates comprising reacting methanol and ammonia over a highly acidic dehydrated aluminosilicate catalyst having a silicon to aluminum ratio of at least 2.0 and manifesting microporous diffusivity for methylamines. Deeba et al., U.S. Pat. No. 4,434,300 disclose a method for improving methanol conversion rates in the reaction of methanol and ammonia to produce methylamines which comprises effecting the reaction in the presence of a macroporous, highly acidic aluminosilicate.

Tompsett, U.S. Pat. No. 4,436,938, discloses a process for making methylamines comprising reacting methanol and/or dimethyl ether over a binderless zeolite A catalyst, preferably a binderless zeolite 5A catalyst.

Kerr et al. in U.S. Pat. No. 3,493,519 describe a process for producing a highly active, hydrothermally stable Y zeolite by calcination of ammonium Y under rapidly flowing steam.

Eberly et al. U.S. Pat. No. 3,506,400 describe a process for preparing steam treated faujasite, mordenite and erionite zeolites with increased silica/alumina ratios.

Parker and Tompsett GB Patent 2,013,660 disclose the steam calcination of zeolite Na-TMA-Fu-1 to prepare a catalyst for the manufacture of methylamines.

Bonifaz, U.S. Pat. No. 4,393,265, discloses steam activation of chabazite-erionite zeolites for production of light olefins from methanol and/or dimethylether.

Haag and Lago, U.S. Pat. No. 4,326,994 describe a method for increasing catalytic activity of zeolite catalysts with $SiO_2/Al_2O_3$ content greater than 12 by contacting the zeolite with steam. The zeolites are utilized for hydrocarbon conversion processes such as cracking, alkylation and isomerization.

Ashina et al. European patent application 130407, describe a method for improving the process of production of dimethylamine over the zeolites mordenite, clinoptilolite and erionite by steaming the H-form of the zeolites under 1 to 70 atm of steam at temperatures of 350° C. to 500° C., preferably at 400° C.

Currently, methylamines are produced using an adiabatic plug flow reactor. Although specific conditions do vary depending upon ammonia feed ratio and amount of product recycle, reactor inlet temperatures are generally maintained from about 310° C. to 340° C. The difference between inlet and outlet temeratures is due to exothermicity of the reaction and is moderated by recycled ammonia and trimethylamine. The foregoing temperatures represent a compromise between increasing production rates at a given reactor size, which is favored at higher reaction temperatures, and reducing catalyst deactivation, which is minimized at lower reaction temperatures. A more active catalyst would permit operation at lower reaction temperatures, thus increasing catalyst lifetime.

As the foregoing discussion suggests, new process improvements which optimize dimethylamine yields and suppress production of trimethylamine and dimethylether and which allow lower reaction temperatures while maintaining reactor throughput in this widely-practiced process are of significant interest to the chemical industry.

SUMMARY OF THE INVENTION

The present invention provides a process for producing dimethylamine comprising contacting methanol and/or dimethylether and ammonia, in amounts sufficient to provide a carbon/nitrogen (C/N) ratio from about 0.2 to about 1.5 and at a reaction temperature from about 250° C. to about 450° C., in the presence of a catalytic amount of an acidic zeolite rho, an acidic zeolite ZK-5, or a mixture thereof. The acidic zeolite rho has been prepared by calcining zeolite $NH_4$-rho or H-rho at a temperature of from about 475° C. to about 825° C. in the presence of steam. The acidic zeolite ZK-5 has been prepared by calcining zeolite $NH_4$-ZK-5 or H-ZK-5 at a temperature of from about 325° C. to about 750° C. in the presence of steam. Calcination temperatures of about 500° C. to 650° C. are preferred for zeolite rho and calcination temperatures of about 350° C. to 600° C. are preferred for zeolite ZK-5.

The present invention also provides a process for producing dimethylamine comprising contacting methanol and/or dimethylether and ammonia, in amounts sufficient to provide a carbon/nitrogen (C/N) ratio from about 0.2 to about 1.5 at a reaction temperature from about 250° C. to about 450° C., in the presence of a catalytic amount of an acidic zeolite rho, wherein the acidic zeolite rho has been prepared by calcining zeolite $NH_4$-rho in a vertical furnace at a temperature of from about 525° C. to about 625° C. in the presence of ammonia.

The acidic zeolite rho and ZK-5 catalysts of this invention have higher activity and provide higher selectivity to and yield of dimethylamine than zeolite rho and ZK-5 catalysts that have not been calcined in the specified manner. In the present process for producing dimethylamine, these catalysts suppress production of trimethylamine.

DETAILED DESCRIPTION OF THE INVENTION

Zeolites can be generically described as complex aluminosilicates characterized by a three-dimensional framework structure enclosing cavities occupied by ions and water molecules, all of which can move with significant freedom within the zeolite matrix. In commercially useful zeolites, the water molecules can be removed from or replaced within the framework without destroying its geometry. Zeolites can be represented by the following formula:

$$M_{2/n}O \cdot Al_2O_3 \cdot x\ SiO_2 \cdot y\ H_2O$$

wherein M is a cation of valence n, $x \geq 2$, and y is a number determined by the porosity and the hydration state of the zeolite, generally from 2 to 8. In naturally-occurring zeolites, M is principally represented by Na, Ca, K, Mg and Ba in proportions usually reflecting their approximate geochemical abundance. The cations M are loosely bound to the structure and can frequently be completely or partially replaced with other cations by conventional ion exchange.

Zeolite structure consists of corner-linked tetrahedra with Al or Si atoms at centers of tetrahedra and oxygen atoms at corners. Such tetrahedra are combined in a well-defined repeating structure comprising various combinations of 4-, 5-, 6-, 8-, 10-, and 12-membered rings. The resulting framework consists of regular channels and cages, which impart a useful pore structure for catalysis. Pore dimensions are determined by the geometry of the aluminosilicate tetrahedra forming the zeolite channels or cages, with nominal openings of 0.26 nm for 6-rings, 0.40 nm for 8-rings, and 0.55 nm for 10 rings. Pore dimensions are critical to catalytic performance, since this characteristic determines whether reactant molecules can enter and product molecules can exit the zeolite framework. In practice, it has been observed that very slight decreases in ring dimensions can effectively hinder or block movement of particular reactants or products within a zeolite structure.

The pore dimensions which control access to the interior of the zeolite are determined not only by the tetrahedra forming the pore opening, but also by the presence or absence of ions in or near the pore. In the case of zeolite A, for example, access can be restricted by monovalent ions, such as $Na^+$ or $K^+$, which are situated in or near 8-ring openings as well as 6-ring openings. Access is enhanced by divalent ions, such as $Ca^{2+}$, which are situated only in or near 6-rings. Thus K-A and Na-A exhibit effective pore openings of about 0.3 nm and 0.4 nm respectively, whereas Ca-A has an effective pore opening of 0.5 nm.

Useful references generally relating to zeolite structure and characterization include the following:
Meier et al., *Atlas of Zeolite Structure Types* (International Zeolite Assn. 1978);
Mumpton, "Natural Zeolites" in *Reviews in Mineralogy* 14:1 (1977);
Smith, "Origin and Structure of Zeolites" in *Zeolite Chemistry and Catalysis,* ACS Monograph 171 (American Chemical Society, 1976).

General Characteristics of Zeolites Rho and ZK-5

Zeolite rho, one of the zeolite species employed in the process of the present invention, is a small-pore synthetic zeolite which can be described by the formula $(Na,Cs)_{12}Al_{12}Si_{36}O_{96} \cdot 44\ H_2O.$ The structure and synthesis of this synthetic zeolite are described by Robson et al., "Synthesis and Crystal Structure of Zeolite Rho—A New Zeolite Related to Linde Type A", *Advances in Chemistry Series* 121 (American Chemical Society 1973), and Robson, U S. Pat. No. 3,904,738. The combined disclosures of these references are incorporated by references herein.

The cationic species $Na^+$ and $Cs^+$ present in rho zeolites can be exchanged for protons in a conventional ion exchange with $H^+$ or by conversion to an ammonium-exchanged form ($NH_4$-rho) which is subsequently converted to an acid form by calcination at elevated temperatures.

Zeolite ZK-5 is a synthetic zeolite first described by Robson, U.S. Pat. No. 3,720,753. The disclosure of this patent, which provides details regarding synthesis of the ZK-5 zeolites, is incorporated by reference herein. The structure of ZK-5 consists of truncated cuboctahedra linked by hexagonal prisms and enlarged double 8-rings with openings of 0.39 nm. ZK-5 zeolites can be characterized by the following formula:
$(K,Cs)_{30}Al_{30}Si_{66}O_{192} \cdot 98\ H_2O.$ The cationic species $K^+$ and $Cs^+$ present in ZK-5 zeolites can be exchanged for protons in a conventional ion exchange with $H^+$ or by conversion to an ammonium-exchanged form ($NH_4$-ZK-5) which is subsequently converted to an acid form by calcination at elevated temperatures.

Acid forms of zeolites can be prepared by a variety of techniques including ammonium exchange followed by calcination, direct exchange of alkali ions for protons using mineral acids or ion exchangers, and by introduction of polyvalent ions (for a discussion of acid sites in zeolites, see J. Dwyer, "Zeolite Structure, Composition and Catalysis" in *Chemistry and Industry,* Apr. 2, 1984). The acid sites produced are generally believed to be of the Bronsted (proton donating) type or of the Lewis (electron pair accepting) type. Bronsted sites are generally produced by deammoniation at low temperatures, exchange with protons, or hydrolysis of polyvalent cations. Lewis sites are believed to arise from dehydroxylation of the H-zeolites or from the presence of polyvalent ions. In the acidic zeolite catalysts of the present invention, Bronsted and/or Lewis sites can be present.

The crystal structure of zeolite rho is characterized by large cuboctahedral cages linked by double 8-rings, defining pore openings of approximately 0.39×0.51 nm. One unusual characteristic of the structure of zeolite rho is the presence of two independent 3-dimensionally-connected systems of channels. A further unique structural feature, described by Parise et al., *J. Phys. Chem.* 88:1635 (1984) is a structural change occurring upon dehydration which results in an increase in ellipticity of the aforementioned 8-ring pore openings. If a dehydrated sample of zeolite rho is heated further, an increase in unit cell dimensions results, accompanied by a decrease in ellipticity of the 8-ring pore openings.

It should be noted that catalytic selectivity for dimethylamine provided by zeolite rho or ZK-5 cannot be attributed solely to its geometry. Other factors, for example, the number and nature of acid sites on internal and external surfaces, crystallite size, external surface modifiers, and contaminants can also be expected to affect selectivity for dimethylamine.

Catalyst activity is a significant consideration in process efficiency, since it influences the reactor size, the amount of catalyst required, and the reaction temperature required to achieve a given level of production. Reaction temperature must be increased or feed rates must be lowered for less active catalysts, in order to obtain conversions similar to those obtainable using a more active catalyst. Catalyst lifetime of all the zeolite species discussed herein is greatly reduced at higher temperatures; accordingly, it is desirable to operate at temperatures below 350° C.

The present invention provides catalysts which are both highly selective to DMA production, and significantly more active than those disclosed by the prior art. The higher activities provided by these acidic zeolite rho and ZK-5 catalysts permit operation at lower temperatures than those commonly employed in current commercial processes and at lower temperatures than those that can be used with these same zeolites that are not calcined in the specified manner. Operation at lower temperatures (75° C. to 100° C. lower than those commonly employed commercially) significantly extends catalyst lifetimes, thereby increasing process efficiency.

In the process of this invention it has been found that the catalyst activity of an acidic zeolite rho can be increased and the selectivity for dimethylamine can be enhanced by the calcination of zeolite $NH_4$-rho or H-rho at a temperature of from about 475° C. to about 825° C. in the presence of steam. The steam can be mixed with ammonia and/or an inert gas suh as nitrogen. It has also been found that the catalytic activity of an acidic zeolite ZK-5 can be increased and the selectivity for dimethylamine can be enhanced by the calcination of $NH_4$-ZK-5 or H-ZK-5 at a temperature of from about 325° C. to about 750° C. in the presence of steam. Again, the steam can be mixed with ammonia and/or an inert gas such as nitrogen. The steam can be rapidly passed over a zeolite bed containing $NH_4$-rho, $NH_4$-ZK-5, H-rho or H-ZK-5 during calcination or generated from zeolitic water in a partially-closed container during calcination of $NH_4$-rho or $NH_4$-ZK-5.

It has further been found that the catalyst activity of an acidic zeolite rho can be increased and the selectivity for dimethylamine can be enhanced by the calcination of zeolite $NH_4$-rho in a vertical furnace at a temperature of from about 525° C. to about 625° C. in the presence of ammonia. The ammonia can be mixed with an inert gas such as nitrogen.

Catalyst Preparation

Zeolite rho can be synthesized in a Na-Cs form substantially according to the procedure of Robson, U.S. Pat. No. 3,904,738, the relevant disclosure of which is incorporated herein by reference. In one method of preparing the H-form employed in the process of this invention, $Na^+$ and $Cs^+$ ions are exchanged for $NH_4^+$ ions and the resulting $NH_4$-rho is deammoniated by calcination at 400° C. to 800° C. Although ion exchange of ammonium for $Na^+$ and $Cs^+$ ions may be incomplete in any given experiment, typically leaving 0.5–1.0 Cs per unit cell, the product of ion-exchange is referred to herein as $NH_4$-rho. Similarly, although deammoniation of $NH_4$-rho may not result in complete conversion of all $NH_4^+$ to $H^+$ or other acid sites, particularly when a sample is calcined at lower temperatures, the resulting product is referred to herein as "zeolite H-rho".

Zeolite ZK-5 can be synthesized in a K-Cs form substantially according to the procedure disclosed in Robson, U.S. Pat. No. 3,720,753, the relevant disclosure of which is incorporated herein by reference. In one method of preparing the H-form employed in the process of this invention, $K^+$ and $Cs^+$ ions are exchanged for $NH_4^+$ ions and the resulting $NH_4^+$ form deammoniated by calcination at 400° C. to 700° C. More extensive exchange produces lower Cs content, which results in higher DMA selectivity at low dimethylether (DME) production levels when methanol is used as a feed. Although ion exchange of ammonium for $K^+$ and $Cs^+$ ions may be incomplete in any given experiment, typically leaving 1–5 Cs ions per unit cell, the product of ion-exchange is referred to herein as $NH_4$-ZK-5 or ammoniated ZK-5. Similarly, although deammoniation of $NH_4$-ZK-5 may not result in complete conversion of all $NH_4^+$ sites to $H^+$ or other acid sites, particularly when a sample is calcined at lower temperatures, the resulting product is referred to herein as "zeolite H-ZK-5".

Identification of zeolite Na,Cs-rho or K,Cs-ZK-5 is generally made by X-ray powder diffraction. The integrated intensities of the observed X-ray peaks can be used as a measure of zeolite crystallinity. High intensities indicate a highly crystalline product, while low intensities indicate a less crystalline material. However, as crystallite size falls below about 50 nm, X-ray diffraction peaks broaden (H. P. Klug and L. E. Alexander, *X-Ray Diffraction Techniques*, Wiley-Interscience, N.Y., 1974). When crystallite size falls below about 2–6 nm, peaks become so broad that they are difficult to detect by conventional analog recording spectrometers.

However, despite a lack of measurable X-ray peak intensity, such "X-ray amorphous" zeolite crystallites are capable of shape selective catalysis, as recently reported by Jacobs et al., *J. Chemical Society, Chemical Communications*, p. 591 (1981). For such crystallites, zeolite crystallinity is evident from infra-red spectra, sorption measurements, and catalytic shape selectivity. The acidic rho or ZK-5 zeolites of the present invention can be highly crystalline, poorly crystalline, or X-ray amorphous crystallites.

Cation-exchanged forms of zeolites rho or ZK-5 can be prepared from alkali forms of zeolites rho or ZK-5, respectively, or from zeolites H-rho or H-ZK-5, respectively, by contacting a crystalline form of the zeolite with a solution containing the ion to be exchanged. Repeated applications of fresh solutions are necessary to obtain a significant degree of cation exchange.

It is known (Robson, U.S. Pat. No. 3,904,738; Barrer et al., *Proc. 5th Conf. on Zeolites*, Naples, 1980, pp. 20–29) that small amounts of chabazite, Pc and pollucite impurities are frequently found in rho preparations. It is believed that these impurities and small quantities of residual gel are not selective to dimethylamine, and thus might reduce the selectivity to a degree dependent upon the quantity present in individual samples.

It has previously been established (Kerr, "Hydrogen Zeolite Y, Ultrastable Zeolite Y, and Aluminum-Deficient Zeolites", in *Molecular Series, Advances in Chemistry Series* 121:210 (American Chemical Society, 1973)) that $NH_4$-zeolites deammoniated by deep-bed calcination techniques exhibit properties distinct from those of zeolites deammoniated by shallow-bed calcination techniques. Deep-bed calcination refers to combinations of bed geometry and calcination conditions, e.g., thick beds and/or slow flow of gas over zeolite, which do not result in rapid removal of gaseous $H_2O$ and $NH_3$ from the heated zeolite. In contrast, shallow-bed calcination refers to bed geometries and conditions, e.g., shallow beds and rapid stripping of gases from the bed, which maximize removal of $NH_3$ and zeolitic $H_2O$ from zeolite.

The nature of the differences between acid forms of zeolites rho and ZK-5 as prepared by the above-described techniques has not been precisely determined.

It has been suggested, however, that products of deep-bed calcination conditions contain nonframework Al species which have dissociated from the zeolite lattice during the deammoniation process. Freude et al., *Zeolites,* 3:171 (1983) have shown that, according to temperature and the degree of deep-bed calcination of zeolite NH$_4$-Y, nonframework Al species containing octahedrally-coordinated Al are progressively condensed. Presumably such nonframework species function as catalytically active sites or as modifiers of other catalytically-active sites. Conceivably, such highly-condensed species present following high-temperature calcination are responsible for the surprisingly high proportion of dimethylether produced over zeolites H-rho and ZK-5 calcined at high temperatures under deep-bed conditions. Alternatively, the high dimethylether yields might be caused by other catalytic sites produced during the dealumination process and the extra lattice Al phase might not be directly involved. It is believed that when methanol is used as a feed the formation of dimethylether adversely affects the performance of zeolites H-rho and H-ZK-5 in methylamine synthesis. Dimethylether formation represents a methanol yield loss. The recovery and recycling of dimethylether would reduce the incentive for using zeolite H-rho or zeolite H-ZK-5 as a catalyst. As illustrated by the Examples set foth below, the method of deammoniation significantly affects catalytic activity, and hence, product distribution, when acid forms of zeolite rho or zeolite ZK-5 are employed as catalysts in the reaction of methanol and-/or dimethylether and ammonia to produce mono-, di-, and trimethylamine.

In general, zeolites H-rho and H-ZK-5 exhibit greater selectivity to dimethylamine when the NH$_4$-forms are calcined in steam, air or inert gas at higher temperatures and/or for longer times. Calcination in the presence of steam requires shorter calcination times to reach the optimum catalytic state than calcination in air or inert gas. Increased deammoniation temperatures appear to be more effective than increased calcination period for increasing selectivity to dimethylamine. However, deep-bed and steam calcinations at high temperatures (>650° C.) can result in a catalyst with higher levels of dimethylether (DME) production when using methanol as a feed than those at lower temperatures.

Generally, calcination temperatures must be sufficiently high to convert substantially all NH$_4^+$ sites to H$^+$ sites and other acid sites, yet not high enough to render significant amounts of the zeolite amorphous. The presence of NH$_4^+$ in a given sample can be determined by infrared measurements. Excessive calcination can lead to collapse of zeolite crystalline structure and an amorphous state, which is to be distinguished from the "X-ray amorphous" zeolitic materials described above. The "X-ray amorphous" zeolites are obtained by limiting crystallization times, so that very small zeolite crystallites result. These crystallites exhibit characteristic zeolite selectivity, but permit rapid ingress of reactant molecules and egress of product molecules due to their small size.

Zeolite H-ZK-5 containing relatively large quantities of Cs, e.g. 4 Cs ions/unit cell, exhibits greater selectivity to dimethylamine when the NH$_4$-form is calcined under deep-bed conditions at higher temperatures and/or for longer times. Increased deammonation temperatures, however, appear to be more effective than increased calcination periods in increasing selectivity for dimethylamine. However, when zeolite NH$_4$-ZK-5 containing relatively large quantities of Cs is calcined at high temperature (>650° C.) under deep-bed conditions, the resulting catalyst shows high levels of dimethylether production when using methanol as a feed. When zeolite NH$_4$-ZK-5 containing smaller quantities of Cs, e.g. 1 Cs ion/unit cell, is calcined under either shallow-bed or deep-bed conditions, dimethylamine selectivities do not seem to be highly dependent on calcination temperature. Regardless of Cs content, deep bed calcination conditions appear to be more effective in achieving high dimethylamine selectivities than shallow-bed calcination conditions.

In the process of this invention, zeolite NH$_4$-rho is calcined by heating in the presence of steam or steam mixed with ammonia and/or an inert gas such as nitrogen at a temperature from about 475° C. to about 825° C. Preferably, calcination is conducted from 500° C. to about 650° C. Generally, calcination periods of 1 to 6 hours are sufficient. Alternatively, NH$_4$-rho can first be calcined in inert gas to give H-rho and the resultant H-rho can be heated in the presence of steam or steam mixed with ammonia and/or an inert gas such as nitrogen at a temperature of 475° C. to about 825° C. The gas volume ratio of steam to the total amount of ammonia and inert gas present is typically at least about 0.01, preferably at least about 0.10. However, these ratios depend on the time the zeolite remains in contact with the steam. Lower steam partial pressures can be used for calcination times greater than 4 hours.

In the process of this invention, zeolite NH$_4$-ZK-5 is calcined by heating in the presence of steam or steam mixed with ammonia and/or an inert gas such as nitrogen at a temperature from about 325° C. to about 750° C. Preferably, calcination is conducted from 350° C. to about 600° C. Generally, calcination periods of 1 to 6 hours are sufficient. Alternatively, NH$_4$-ZK-5 can first be calcined in inert gas to give H-ZK-5 and the resultant H-ZK-5 can be heated in the presence of steam or steam mixed with ammonia and/or an inert gas such as nitrogen at a temperature of 375° C. to about 750° C. The gas volume ratio of steam to the total amount of ammonia and inert gas present must be at least about 0.01, preferably at least about 0.10.

Normal deep-bed conditions serve to generate H$_2$O and NH$_3$ during calcination of the NH$_4$-zeolite forms and it has been found that if extra pains are taken to prevent the escape of self-generated H$_2$O and NH$_3$ by using a semiclosed system, the resultant steam treated zeolite rho or ZK-5 catalyst provides improved dimethylamine yields from the methanol and/or dimethylether and ammonia reaction.

Shallow-bed steaming conditions can refer to conditions with a shallow flat bed of zeolite over which there is a rapid flow of steam or to a condition in which the flowing steam and other gases are forced through the zeolite from below in a vertical quartz furnace tube equipped with a vibrator so as to place the zeolite particles in a state of constant agitation and thus to fluidize the zeolite particles. Such fluidization is believed to result in rapid removal of NH$_3$ and to allow intimate contact of each particle with the flowing steam.

Although calcination temperatures of about 500° C. to 650° C. are preferred for zeolite rho and calcination temperatures of about 350° C. to 600° C. are preferred for zeolite ZK-5, if DME production can be tolerated the upper limit for calcination temperatures for zeolite rho can be extended to about 825° C. and for zeolite ZK-5 to about 750° C.

Zeolite NH₄-rho can also be calcined by heating in a vertical furnace in the presence of ammonia and/or an inert gas such as nitrogen at a temperature from about 525° C. to about 625° C.

Process Conditions

As previously noted, the process of the present invention comprises reacting methanol and/or dimethylether (DME) and amoonia, in amounts sufficient to provide a carbon/nitrogen (C/N) ratio from about 0.2 to about 1.5, at a temperature from about 250° C. to about 450° C., in the presence of a catalytic amount of the steam-treated or steam/ammonia-treated acidic zeolite rho or ZK-5. Preferably, reaction pressures are from about 1 to about 1000 psi (about 7 to about 7000 kPa) with a methanol/DME space time of from about 0.01 to about 80 hours. The resulting conversion of methanol and/or DME to methylamines is generally in excess of 85% (on a mole basis) and selectivity (on a mole basis) to dimethylamine is generally greater than 40%. In addition, selectivity to and yield of trimethylamine is suppressed. Thus, molar yields of dimethylamine generally exceed 40% and molar yields of trimethylamine generally are less than 30% under the process conditions of the present invention.

The process variabes to be monitored in practicing the process of the present invention include C/N ratio, temperature, pressure, and methanol/DME space time. The latter variable is calculated as catalyst mass divided by the mass flow rate of methanol and DME introduced to a process reactor (mass catalyst/mass methanol + DME fed per hour).

Generally, if process temperatures are too low, reduced conversion of reactants to dimethylamine will result. On the other hand, if temperatures are excessively high, equilibrium conversions and catalyst deactivation can occur. Preferably, temperatures are maintained between about 300° C. and about 400° C., with lower temperatures within this range especially preferred in order to minimize catalyst deactivation. At relatively low pressures, products must be refrigerated to condense them for further purification, adding cost to the overall process. However, excessively high pressures require costly thick-walled reaction vessels. Most preferred pressures range from about 10 to about 500 psi (about 70 to about 3000 kPa). Short methanol/DME space times result in low conversions and tend to favor the production of monomethylamine. Long methanol/DME space times may result either in inefficient use of catalyst or production of an equilibrium distribution of methylamines at very high converions. Methanol/DME space times of from about 0.01 to about 80 hours are preferred, with methanol/DME space times of from about 0.10 to about 1.5 hours being most preferred (corresponding to methanol/DME space velocities of from about 0.013 to about 100 g methanol+DME/g catalyst/hour, most preferably from about 0.67 to about 10 g methanol+DME/g catalyst/hour).

The reactant ratio of methanol and/or DME to ammonia, herein expressed as the C/N ratio (g atoms C/g atoms N), is critical to the process of the present invention. As the C/N ratio is decreased, production of monomethylamine is increased. As the C/N ratio is increased, production of trimethylamine increases. Catalyst deactivation is also greater at high C/N ratios. Accordingly, for best results, C/N ratios should be maintained between about 0.2 to about 1.5, and preferably from about 0.5 to about 1.2 in conducting the process of the present invention.

The efficiency of the process of the invention is measured by overall conversion of methanol and/or DME to methylamines, and by selectivity of dimethylamine production. For example, if methanol is used as the sole reactant, overall conversion is determined by comparison of the amount (in moles) of methanol in the product mixture, which is considered to be unconverted, to the amount in the reactant feed. Thus, overall conversion in percent, is given by:

$$100 \left(1 - \frac{\text{Moles MeOH in product}}{\text{Moles MeOH in feed}}\right)$$

Conversion of methanol to methylamines, in percent, is given by:

$$100 \left(1 - \frac{\text{Moles MeOH in Product} + 2(\text{Moles DME in Product})}{\text{Moles MeOH in feed}}\right)$$

Conversion of methanol to monomethylamine (MMA) in percent, is given by:

$$100 \left(\frac{\text{Moles MMA}}{\text{Moles MeOH in feed}}\right)$$

Similarly, conversion of methanol to dimethylamine (DMA), in percent, is given by:

$$100 \left(\frac{2(\text{Moles DMA})}{\text{Moles MeOH in feed}}\right)$$

and conversion of methanol to trimethylamine (TMA), in percent, is given by:

$$100 \left(\frac{3(\text{Moles TMA})}{\text{Moles MeOH in feed}}\right)$$

Finally, selectivity to DMA is calculated by analysis of product composition. Thus, selectivity to DMA, in percent, is provided by the following expression:

$$100 \left(\frac{2[\text{DMA}]}{[\text{MMA}] + 2[\text{DMA}] + 3[\text{TMA}]}\right)$$

For preferred operation, the catalyst must be selective at high conversions (87-98%) and a C/N ratio of 0.5-1.2.

Catalyst activity estimates were made from space-times which are determined by reactant feed rates and catalyst loadings at a 325° C. reaction temperature, atmospheric pressure and 90% methanol conversion. These parameters were chosen since this conversion is typical of commercially practiced MeOH conversions and the temperature represents an improvement over the commercially accepted reaction temperatures, i.e., it is a lower temperature than commercially practiced. Relative activity is defined as the ratio of the spacetime for a catalyst calcined in the presence of steam to obtain 90% conversion of MeOH at 325° C. to the spacetime for a catalyst of the same composition calcined in the absence of steam to obtain the same conversion of MeOH at the same temperature. Less active catalysts require higher spacetimes to obtain the same conversion as more active catalysts.

In practicing the process of the invention, the zeolite catalyst can be combined with another material unreactive at the temperature and other conditions employed in the process. Such matrix materials include synthetic or natural substances such as clays, silica, alumina, and other metal oxides Comparison of selectivities for different samples should be made at similar conversions, since selectivity changes with conversion. At low conversions, MMA production is favored; at very high conversions, the reaction will approach an equilibrium distribution and thus result in increased TMA production.

The process of the present invention can be further understood by reference to the following Examples, wherein all temperatures are expressed in degrees Celsius (° C) and all percentages are by weight unless otherwise indicated. In composition determinations, it was assumed that there were 96 oxygen atoms per unit cell in zeolite rho and 192 oxygen atoms per unit cell in zeolite ZK-5. Analysis determined the relative amounts of the various cations present, and remaining positively-charged species were assumed to be hydrogen.

EXAMPLE 1 AND COMPARISONS A AND B

A mixture of 200 mL 4 M $Na_2AlO_2OH$, 56 mL 50% CsOH, and 26 g NaOH was added to 720 mL of a colloidal silica commercially available from E.I. duPont de Nemours and Company under the registered trademark Ludox (LS-30) in a polytetrafluoroethylene bottle, and permitted to stand at 25° for 9 days. The resulting mixture was then heated at 100° for 7 days, allowed to stand at 25° for an additional 3 days, and then reheated to 100° for 24 hours. The resulting product was then washed and contacted overnight 3 times with a 20% $NH_4NO_3$ solution. The resulting preparation of zeolite $NH_4$-rho indicated a formula upon analysis of $(NH_4)_{9.6}Cs_{1.1}Al_{10.3}Si_{37.7}O_{96}\cdot 42.9\ H_2O$.

A portion of the zeolite $NH_4$-rho was treated by a stagnant deep-bed calcination technique. A sample consisting of 6.9 g of $NH_4$-rho was put into a quartz tube, having a diameter of about 20 mm, with one end sealed off and the other end having a vacuum stopcock. The tube was attached to a common manifold and a furnace was placed around the tube. The sample was heated at atmospheric pressure (the manifold was open to the air) to 650° in about 7 hours. Some condensation was observed in the stopcock when the samples were at a temperature of about 375°. This condensation was present during the calcination process at 650° and indicated that the atmosphere above the sample contained about 20 torr water vapor.

For comparison, two other portions of zeolite $NH_4$-rho were converted to H-rho by a shallow-bed calcination technique. In Comparison A, H-rho was prepared according to the following procedure. 5.0 g of $NH_4$-rho were spread out in an $Al_2O_3$ boat, passed into the hot zone of a belt furnace at 0.64 cm/minute, and held at 600° for 4 hours under a $N_2$ flow of 20 L/minute. An infra-red spectrum indicated, from the absence of an absorption band at 1400 $cm^{-1}$, that substantially all $NH_4^+$ ions had decomposed, giving H-rho containing essentially no $NH_4^+$. In Comparison B, H-rho was prepared by this shallow-bed calcination technique at 700° under the conditions indicated in Table I.

Each of these three samples which underwent different calcination conditions was formed into 1" (2.5 cm) diameter pellets under 20,000 psi. The pellets were crushed and sieved to pass a sieve having 850 μm openings (Sieve No. 20 ASTM Standard) but not to pass a sieve having 425 μm openings (Sieve No. 40 ASTM Standard).

Two grams of each preparation of crushed and sieved zeolite H-rho were in turn placed in a stainless-steel U-tube reactor 0.125 in (0.55 cm) in diameter and about 12 in (30 cm) in length for evaluation as a catalyst. The reactor was heated to reaction temperature in a fluidized sand bath in 20-30 minutes. The reaction was carried out at atmospheric pressure (14.7 psi, 101 kPa). Reactants methanol and ammonia were fed to a preheater as a liquid mixture at a molar ratio of about 1, vaporized, and then passed through the reactor into contact with the catalyst. Reaction temperatures and reactant flow rates are shown in Table I below.

The reactor effluent was analyzed by gas chromatography for ammonia, dimethylether (DME), methanol, water, and mono-, di-, and trimethylamine. The percentage conversions of methanol (overall), of methanol to methylamines (MA), of methanol to DME, and the percentage selectivities of conversion to each methylamine species are given in Table I below. That portion of methanol converted to other than methylamines was converted to DME in this and all other Examples reported herein.

EXAMPLE 2 AND COMPARISON C

Zeolite (K,Cs)-ZK-5 was prepared substantially according to the procedure set forth in Example 3 of Robson, U.S. Pat. No. 3,720,753, the disclosure of which is incorporated herein by reference. An X-ray diffraction pattern obtained for the resulting product agreed with that indicated in that patent for (K,Cs)-ZK-5. A cubic cell dimension derived from this X-ray diffraction pattern was a=1.867 nm. $NH_4$-ZK-5 was prepared by contacting 50 g of the (K,Cs)-ZK-5 with a 10% $NH_4NO_3$ solution at 80° for two one-hour periods (with changes of the ammonium nitrate solution) followed by a calcination in air at 500°, one more $NH_4^+$ exchange at 80° and drying at 110°.

A portion of the zeolite $NH_4$-ZK-5 was treated by a stagnant deep-bed calcination technique. A sample consisting of 7.58 g of $NH_4$-ZK-5 was put into a quartz tube, having a diameter of about 20 mm, with one end sealed off and the other end having a vacuum stopcock. The tube was attached to a common manifold and a furnace was placed around the tube. The sample was heated at atmospheric pressure (the manifold was open to the air) to 500° in about 7 hours. Some condensation was observed in the stopcock when the samples were at a temperature of about 375°. This condensation was present during the calcination process at 500° and indicated that the atmosphere above the sample contained about 20 torr water vapor.

In Comparison C another portion of zeolite $NH_4$-ZK-5 was converted to H-ZK-5 by a deep-bed calcination technique. 15 g of $NH_4$-ZK-5 were placed in an $Al_2O_3$ crucible and held at 500° for 10 hours under flowing $N_2$. An infra-red spectrum indicated, from the absence of an absorption band at 1400 $cm^{-1}$, that substantially all $NH_4^+$ ions had decomposed, giving H-ZK-5 containing essentially no $NH_4^+$.

Each of these two samples which underwent different calcination conditions was formed into 1" (2.5 cm) diameter pellets under 20,000 psi. The pellets were crushed and sieved to pass a sieve having 850 μm openings (Sieve No. 20 ASTM Standard) but not to pass a sieve having 425 μm openings (Sieve No. 40 ASTM Standard).

Two grams of each preparation of crushed and sieved zeolite H-ZK-5 were in turn placed in a stainless-steel U-tube reactor 0.125 in (0.55 cm) in diameter and about 12 in (30 cm) in length for evaluation as a catalyst. The reactor was heated to reaction temperature in a fluidized sand bath in 20–30 minutes. The reaction was carried out at atmospheric pressure (14.7 psi, 101 kPa). Reactants methanol and ammonia were fed to a preheater as a liquid mixture at a molar ratio of about 1, vaporized, and then passed through the reactor into contact with the catalyst. Reaction temperatures and reactant flow rates are shown in Table I below.

The reactor effluent was analyzed by gas chromatography as in Example 1. The percentage conversions of methanol (overall), of methanol to methylamines (MA), of methanol to DME, and the percentage selectivities of conversion to each methylamine species are given in Table I below. That portion of methanol converted to other than methylamines was converted to DME in this and all other Examples reported herein.

Examples 1 and 2 demonstrate that thermal treatment in the presence of water vapor and ammonia generated during the calcination of $NH_4$-rho or $NH_4$-ZK-5 in a semiclosed system so as to prevent escape of $H_2O$ and $NH_3$ provides exceptionally high yields of DMA and low yields of TMA for rho and ZK-5 zeolites relative to those obtained for H-rho and H-ZK-5 produced by shallow-bed or deep-bed calcination in rapidly flowing $N_2$.

EXAMPLES 3–6 AND COMPARISONS D–G

Zeolite rho was prepared in a Na,Cs-form by mixing 400 mL 4M $Na_2AlO_2OH$, 112 mL 50% CsOH, and 64 g NaOH with 1440 mL of the colloidal silica described in Example 1. The resulting mixture was permitted to stand 6 days at 25°. The mixture was then heated at 90° for 3 days. The resulting product was washed and dried. The above procedure was repeated and the dried products from the two batches were combined. The X-ray diffraction pattern obtained on the product showed it to contain primarily zeolite rho but with a substantial amount of pollucite present. 500 g of the zeolite Na,Cs-rho were contacted three times with 5 L of 10% $NH_4NO_3$ for 1 hour each time to give $NH_4$-rho.

A series of samples of this $NH_4$-rho was treated using a vertically mounted tube furnace in which fluidization of the zeolite is achieved by vibration and flowing gases. Flowing nitrogen (75 mL/min) was passed through a sample of 5 g of $NH_4$-rho placed in a quartz tube in a vertically mounted tube furnace equipped with a vibrator and heated at a rate of 250°/hour to the desired calcination temperature under flowing nitrogen. At this calcination temperature, the sample was further heated for 4 hours under either flowing nitrogen (75 mL/min) or nitrogen which was first bubbled through water at 95° (p($H_2O$)=630 torr). The calcination temperatures used were chosen at 100 degree intervals, i.e., 500°—Example 3 and Comparison D; 600°—Example 4 and Comparison E; 700°—Example 5 and Comparison F; and 800°—Example 6 and Comparison G as given in Table II. Each sample was evaluated substantially according to the procedure of Example 1. Results are shown in Table II.

TABLE II

Effect of Various Calcinations Upon Selectivity of Zeolite H—rho for Methylamines

| Ex/ Comp | Calcination Atm | Calcination Temp (°C.) | Reaction Temp (°C.) | Reaction Feed Flow (mL/h) | MeOH- Conv. (%) | MeOH—Ma Conv. (%) | MeOH—DME Conv. (%) | Selectivity (%) MMA | DMA | TMA |
|---|---|---|---|---|---|---|---|---|---|---|
| 3 | $H_2O/N_2$ | 500 | 325 | 8 | 89 | 86 | 3 | 13 | 48 | 39 |
| D | $N_2$ | 500 | 325 | 3 | 93 | 85 | 8 | 8 | 35 | 58 |
| 4 | $H_2O/N_2$ | 600 | 325 | 8 | 90 | 85 | 5 | 14 | 63 | 23 |
| E | $N_2$ | 600 | 325 | 4 | 90 | 83 | 7 | 5 | 33 | 62 |
| 5 | $H_2O/N_2$ | 700 | 350 | 12 | 88 | 75 | 13 | 10 | 73 | 17 |
| F | $N_2$ | 700 | 325 | 8 | 89 | 83 | 6 | 9 | 55 | 36 |
| 6 | $H_2O/N_2$ | 800 | 350 | 8 | 89 | 64 | 25 | 12 | 82 | 6 |
| G | $N_2$ | 800 | 325 | 6 | 94 | 86 | 8 | 11 | 69 | 20 |

EXAMPLE 7 AND COMPARISON H 5 g of $NH_4$-rho prepared according to a method similar to that of Example 3 were placed in a quartz tube equipped with a vibrator in a vertically mounted tube furnace, heated at a rate of 350°/hour to 700° under nitrogen flowing at 75 mL/min which was first passed through water at room temperature (p$H_2O$=25 Torr) and further heated for 6 hours at 700° under the same atmosphere. The resulting material was evaluated for catalytic selectivity substantially as described for Example 1 above. The conditions employed and the results obtained are set forth in Table III.

In Comparison H, another sample was prepared and evaluated substantially as described above except that

TABLE I

Effect of Various Calcinations Upon Selectivity of Zeolite H—rho and Zeolite H—ZK-5 For Methylamines

| Ex/ Comp | Calcination Temp (°C.) | Calcination Time (hr) | Calcination Atm | Reaction Temp (°C.) | Reaction Feed Flow (mL/hr) | MeOH- Conv. (%) | MeOH—MA Conv. (%) | MeOH—DME Conv. (%) | Selectivity (%) MMA | DMA | TMA |
|---|---|---|---|---|---|---|---|---|---|---|---|
| 1 | 650 | 16 | $NH_3/H_2O$ | 325 | 2 | 86 | 73 | 13 | 16 | 80 | 4 |
| A | 600 | 4 | $N_2$ | 300 | 2 | 90 | 83 | 7 | 16 | 76 | 8 |
| B | 700 | 4 | $N_2$ | 325 | 2 | 94 | 87 | 6.7 | 15 | 74 | 11 |
| 2 | 500 | 16 | $NH_3/H_2O$ | 350 | 2 | 95 | 74 | 21 | 14 | 78 | 8 |
| C | 500 | 10 | $N_2$ | 325 | 1 | 94 | 71 | 23 | 13 | 54 | 32 | the nitrogen was not passed through water. The results are set forth in Table III.

EXAMPLE 8

5 g of $NH_4$-rho prepared according to a method similar to that of Example 3 were placed in a quartz tube equipped with a vibrator in a vertically mounted tube furnace, heated at a rate of 350°/hour to 700° under nitrogen flowing at 75 mL/min which was first passed through water at 95° to give $p(H_2O)=630$ Torr heated for 6 hours at 700° under the same atmosphere. The resulting material was evaluated for catalytic selectivity substantially as described for Example 1 above. The conditions employed and the results obtained were set forth in Table III.

heated on a steam bath for 4 and 6 days respectively at 92°-98°. The resulting products were then filtered, dried, combined and contacted with 10% $NH_4NO_3$ at 90° for 65 hours to prepare $NH_4$-rho.

EXAMPLES 9–16 AND COMPARISON I

Examples 9 to 16 and Comparison I illustrate the effect of calcination of $NH_4$-rho in rapidly flowing steam under shallow-bed conditions. Examples 9 to 16 show that shallow-bed steam conditions provide exceptionally high DMA selectivities coupled with low DME yields when using methanol as a feed. They also show that higher activities result from steaming the $NH_4$-rho at temperatures less than 700°.

Portions of the $NH_4$-rho prepared as described above

TABLE III

Effect of Various Calcinations Upon Selectivity of Zeolite H—rho for Methylamines

| Exp. Comp | Calcination Atm | Temp (°C.) | Reaction Temp (°C.) | Feed Flow (mL/h) | MeOH- Conv. (%) | MeOH—Ma Conv. (%) | MeOH—DME Conv. (%) | Selectivity (%) MMA | DMA | TMA |
|---|---|---|---|---|---|---|---|---|---|---|
| 7 | $H_2O/N_2$ | 700 | 325 | 10 | 93 | 87 | 6 | 14 | 49 | 36 |
| H | $N_2$ | 700 | 375 | 10 | 88 | 82 | 6 | 12 | 51 | 38 |
| 8 | $H_2O/N_2$ | 700 | 350 | 14 | 91 | 80 | 11 | 15 | 67 | 19 |

Examples 3–8 illustrate the improvement in DMA selectivity obtained from zeolite H-rho prepared by calcination of $NH_4$-rho in a vertical tube furnace in which fluidization of the zeolite is activated by vibration and flowing steam relative to rapidly flowing nitrogen.

EXAMPLES 9–22 AND COMPARISON I

Examples 9 to 22 and Comparison I illustrate the increase in DMA selectivity coupled with the decrease in DME yield when using methanol as a feed obtained with the use of acidic zeolite H-rho prepared by calcining $NH_4$-rho or H-rho in rapidly flowing steam under shallow-bed conditions.

The zeolite rho used in these Examples and Comparison was prepared by a modification of the general procedure described in Robson, U.S. Pat. No. 3,904,738, the disclosure of which is incorporated herein by reference. Two separate samples of Na,Cs-rho were prepared by combining 200 mL 4 M $Na_2AlO_2OH$, 26 g NaOH, and 56 mL 50% CsOH with 720 mL of the colloidal silica described in Example 1 in a 1000 mL polytetrafluoroethylene bottle. The resulting mixtures were permitted to stand at 25° for 6 days and then were converted to H-rho by using a shallow-bed technique. A mixture of flowing gases (1 L/min) consisting of $N_2$ (Comparison I) or $N_2$ and steam preheated to 150° (Examples 9–16) was passed over a sample of 6.5 g of $NH_4$-rho spread out in a $SiO_2$ boat while the temperature was slowly raised from 25° to the calcination temperature. The sample was maintained under these conditions for 4 hours and cooled under flowing $N_2$. A series of samples was prepared using different temperatures and steam partial pressures using the conditions specified in Table IV. Each sample was evaluated substantially according to the procedure of Example 1. Results are shown in Table IV.

The examples show steaming has a striking effect on the DMA and TMA selectivities. Steam partial pressures of 612 torr and temperatures of 500°-800° give unusually high DMA selectivities.

TABLE IV

Effect of Shallow-Bed Steaming of $NH_4$—rho on the Selectivity for Methylamines

| Ex/ Comp | Calcination Temp (°C.) | Time (hr) | $p(H_2O)$ (torr) | $p(N_2)$ (torr) | Flow Rate (L/ min) | Reaction Temp (°C.) | Feed Flow (mL/ hr) | MeOH Conv. (%) | MeOH—DME Conv. (%) | Selectivity (%) MMA | DMA | TMA | Space-time at 325° C., 90% conv. | Relative Activity* |
|---|---|---|---|---|---|---|---|---|---|---|---|---|---|---|
| A. Effect of steam partial pressure on DMA and TMA selectivities ||||||||||||||||
| I | 600 | 4 | 0 | 760 | 1.0 | 325 | 4.0 | 91 | 8.8 | 12 | 71 | 17 | .47 | 1.00 |
| 9 | 600 | 4 | 612 | 148 | 5.1 | 325 | 6.0 | 92 | 3.7 | 17 | 80 | 3 | .30 | 1.57 |
| 10 | 600 | 4 | 108 | 652 | 1.2 | 300 | 5.0 | 90 | 7.9 | 18 | 52 | 30 | .24 | 1.96 |
| 11 | 600 | 4 | 12.4 | 747.6 | 1.0 | 300 | 6.0 | 90 | 2.5 | 18 | 45 | 37 | .20 | 2.35 |
| 12 | 600 | 4 | 1.2 | 758.8 | 1.0 | 325 | 10.0 | 94 | 5.5 | 17 | 53 | 30 | .30 | 1.57 |
| B. Effect of calcination temperature on DMA and TMA selectivities ||||||||||||||||
| 13 | 500 | 4 | 612 | 148 | 5.1 | 325 | 8.0 | 95 | 2.9 | 14 | 76 | 10 | .20 | 2.35 |
| 14 | 600 | 4 | 612 | 148 | 5.1 | 325 | 6.0 | 92 | 3.7 | 17 | 80 | 3 | .30 | 1.57 |
| 15 | 700 | 4 | 612 | 148 | 5.1 | 325 | 4.0 | 89 | 11 | 16 | 82 | 2 | .75 | 0.63 |
| 16 | 800 | 4 | 612 | 148 | 5.1 | 375 | 2.0 | 94 | 22 | 15 | 79 | 6 | 2.90 | 0.16 |

*Relative activity is the ratio of the spacetime for a zeolite H—rho catalyst calcined in the presence of steam to obtain 90% conversion of MeOH at 325° C. to the spacetime for the zeolite H—rho catalyst of Comparison I calcined in the absence of steam to obtain the same conversion of MeOH at the same temperature.

EXAMPLES 17–21 AND COMPARISON J

Examples 17–21 and Comparison J illustrate the effects of treating H-rho under shallow-bed conditions and rapidly flowing steam. $NH_4$-rho, prepared as described above, was converted to H-rho by slowly raising the temperature from 25° to the calcination temperature specified in Table 5 under flowing $N_2$. Steam preheated to 150° was added to the flowing $N_2$ to give the steam partial pressures shown in Table V. The resulting sample was maintained under these conditions for 4 hours and cooled under flowing $N_2$. A series of samples was prepared using different temperatures and steam partial pressures using the conditions specified in $H_2O$ (liq.) for 1 hour and 500 mL/min $N_2$ and 500 mL/min $NH_3$ for 3 hr.

These catalysts were evaluated substantially according to the procedure of Example 1 and results are given in Table VI.

The Examples show that mixtures of $N_2$, $H_2O$ and $NH_3$ and sequential treatments of steam and $NH_3$ are effective in obtaining high DMA yields over H-rho and increasing the catalyst activity.

TABLE VI

Effect of Various Calcinations Upon Selectivity of Zeolite H—rho for Methylamines

| Ex. | Calcination Temp (°C.) | Time (hr) | p(H$_2$O) (torr) | p(NH$_3$) (torr) | Reaction Temp (°C.) | Feed Flow (mL/hr) | MeOH Conv. (%) | MeOH—DME Conv. (%) | Selectivity (%) MMA | DMA | TMA | Spacetime at 325° C., 90% conv. | Relative Activity* |
|---|---|---|---|---|---|---|---|---|---|---|---|---|---|
| 22 | 600 | 4 | 612 | 74 | 325 | 10.0 | 91 | 2.6 | 14 | 75 | 11 | .18 | 2.61 |
| 23 | 600 | 4 | 612 | 74 | 325 | 8.0 | 91 | 5.5 | 15 | 78 | 7 | .23 | 2.04 |
| 24 | 600 | 1 | 612 | — | | | 89 | 5.1 | 15 | 70 | 15 | .24 | 1.96 |
|    |     | 3 | —   | 380 | 325 | 8.0 | | | | | | | |

*Relative activity is the ratio of the spacetime for a zeolite H—rho catalyst calcined in the presence of steam to obtain 90% conversion of MeOH at 325° C. to the spacetime for the zeolite H—rho catalyst of Comparison I calcined in the absence of steam to obtain the same conversion of MeOH at the same temperature.

Table V. The samples were held under these conditions for 4 hours and cooled under flowing $N_2$. This series of samples was evaluated substantially according to the procedure of Example 1. Results are given in Table V.

These examples show that steaming H-rho has a strong effect on the DMA and TMA selectivities of the product H-rho with pressures of 10–600 torr giving usuusually high DMA selectivities and low DME selectivities when using methanol as a feed. They also show that higher activities result from steaming the H-rho.

EXAMPLES 25–27

Zeolite (K,Cs)-ZK-5 was prepared substantially according to the procedure set forth in Example 2. Zeolite NH$_4$-ZK-5 was prepared for these Examples by contacting 61 g of zeolite (K,Cs)-ZK-5 with a 10% NH$_4$NO$_3$ solution at 80° for twelve four-hour periods (with changes of the ammonium nitrate solution) followed by drying at 110°.

Examples 25 and 26 illustrate the effect of calcination

TABLE V

Effect of Shallow-Bed Steaming of H—rho Upon Selectivity for Methylamines

| Ex/ Comp. | Calcination Temp (°C.) | Time (hr) | p(H$_2$O) (torr) | p(N$_2$) (torr) | Reaction Temp (°C.) | Feed Flow (mL/hr) | MeOH Conv. (%) | MeOH—DME Conv. (%) | Selectivity (%) MMA | DMA | TMA | Spacetime at 325° C., 90% conv. | Relative Avtivity* |
|---|---|---|---|---|---|---|---|---|---|---|---|---|---|
| J  | 600 | 4 | 0    | 760   | 325 | 4.0  | 91 | 8.8 | 12 | 71 | 17 | .47 | 1.00 |
| 17 | 600 | 4 | 612  | 148   | 325 | 8.0  | 91 | 5.8 | 15 | 78 | 7  | .35 | 1.34 |
| 18 | 600 | 4 | 474  | 286   | 325 | 6.0  | 93 | 4.5 | 17 | 80 | 3  | .26 | 1.81 |
| 19 | 600 | 4 | 12.4 | 747.6 | 300 | 4.0  | 93 | 1.8 | 16 | 76 | 8  | .19 | 2.47 |
| 20 | 600 | 4 | 1.2  | 758.8 | 325 | 12.0 | 93 | 4.4 | 15 | 62 | 23 | .27 | 1.74 |
| 21 | 600 | 4 | 0.6  | 759.4 | 325 | 12.0 | 88 | 5.7 | 18 | 61 | 21 | .27 | 1.74 |

*Relative activity is the ratio of the spacetime for a zeolite H—rho catalyst calcined in the presence of steam to obtain 90% conversion of MeOH at 325° C. to the spacetime for the zeolite H—rho catalyst of Comparison I calcined in the absence of steam to obtain the same conversion of MeOH at the same temperature.

EXAMPLES 22–24

Examples 22 to 24 show that treatment of NH$_4$-rho or H-rho in mixtures of steam and ammonia also result in unusually high DMA selectivities.

In Example 22 a 6.5 g sample of NH$_4$-rho from Example 10 was heated from 25° to 600° in 1 hour in a mixture of flowing gases consisting of 500 mL/min $N_2$, 500 mL/min NH$_3$ and 3.33 mL/min $H_2O$ (liq.) corresponding to partial pressures of 74, 74, and 612 torr respectively of $N_2$, NH$_3$ and $H_2O$. The sample was held for 4 hours at 600° C. and cooled to ambient temperature in flowing $N_2$. This sample of H-rho was evaluated in the reaction of methanol and ammonia substantially according to the procedure described in Example 1.

Example 23 was prepared in a similar manner except that H-rho was produced before exposure to NH$_3$ and $H_2O$ by heating from 25° to 600° in flowing $N_2$ (1000 mL/min).

Example 24 was prepared by heating NH$_4$-rho from 25° to 600° in 1 hr to prepare H-rho which was then exposed to a flow of 1000 mL/min $N_2$ and 3.33 mL/min of NH$_4$-ZK-5 in rapidly flowing steam under shallow-bed conditions. Example 25 and 26 show that shallow-bed steam conditions provide exceptionally high DMA selectivities coupled with low DME yields when using methanol as a feed.

Portions of the above NH$_4$-ZK-5 were converted to steamed H-ZK-5 by using a shallow-bed technique. A mixture of flowing gases (1 L/min) consisting of $N_2$ or $N_2$ and steam preheated to 150° was aassed over a sample of 6.5 g of NH$_4$-ZK-5 spread out in a SiO$_2$ boat while the temperature was slowly raised from 25° to 350° in Example 25 and 450° in Example 26. The samples were maintained under these conditions for 4 hours and cooled under flowing $N_2$. Each sample was evaluated substantially according to the procedure of Example 1. Results are shown in Table VII.

Example 27 illustrates the effect of treating H-ZK-5 under shallow-bed conditions and rapidly flowing steam. Using the technique described for Examples 17–21, NH$_4$-ZK-5 was converted to H-ZK-5 in flowing N₂ by slowly raising the temperature from 25° C. to the calcination temperature of 500°. After reaching the reaction temperature steam preheated to 150° was added to the flowing N₂ to give a steam partial pressure of 612 Torr. The sample was held under these conditions for 4 hours and cooled under flowing N₂. This sample was evaluated substantially according to the procedure of Example 1. Results are given in Table VII.

These examples show that steaming NH₄-ZK-5 or H-ZK-5 gives unusually high DMA selectivities and low DME selectivities when using methanol as a feed.

Example 1 above. The conditions employed and the results obtained are set forth in Table VIII.

In Comparison K, a 7 g sample of NH₄-rho prepared as described above was placed in a quartz tube in a vertically mounted tube furnace and calcined under flowing N₂ only, by raising the temperature 60°/hour to 600°, and then heating at 600° for 10 hours. The resulting material was cooled under flowing N₂.

This material was evaluated for catalytic selectivity substantially according to the procedure described in Example 1 above. The conditions employed and the

TABLE VII

| | Effect of Shallow-Bed Steaming of NH₄—ZK-5 and H—ZK-5 on the Selectivity for Methylamines | | | | | | | | | |
|---|---|---|---|---|---|---|---|---|---|---|
| | Calcination | | | | Reaction | | MeOH | MeOH—DME | Selectivity (%) | | |
| Ex. | Temp (°C.) | Time (hr) | p(H₂O) (torr) | p(NH₃) (torr) | Temp (°C.) | Feed Flow (mL/hr) | Conv. (%) | Conv. (%) | MMA | DMA | TMA |
| 25 | 350 | 4 | 612 | 74 | 350 | 8.0 | 88 | 8.2 | 12 | 66 | 22 |
| 26 | 450 | 4 | 612 | 74 | 375 | 5.0 | 95 | 6.3 | 20 | 68 | 12 |
| 27 | 500 | 4 | 612 | 74 | 375 | 4.0 | 93 | 6.9 | 26 | 67 | 7 |

EXAMPLES 28–29 AND COMPARISONS K–L

Examples 28 and 29 of the invention and Comparisons K and L demonstrate that ammonia treatment during calcination of zeolite NH₄-rho in a vertical furnace provides a catalyst with dimethylamine selectivity superior to that exhibited by zeolite H-rho prepared in a vertical furnace. Zeolite H-rho provides dimethylamine selectivity generally superior to reported prior art catalysts for conversion of methanol and ammonia to dimethylamine.

EXAMPLE 28 AND COMPARISON K

Zeolite rho was prepared in a Na,Cs form by mixing 200 mL 4M Na₂AlO₂OH, 56 mL 50% CsOH, and 26 g NaOH with 720 mL the colloidal silica described in Example 1 in a polytetrafluoroethylene bottle. The resulting mixture was permitted to stand for 9 days at 25°. The mixture was then heated at 100° for 7 days, and then allowed to stand for an additional 3 days at 25°. Finally, the mixture was reheated for 24 hours at 100°. The resulting product was then washed and contacted overnight with a 20% solution of NH₄NO₃. This step was repeated twice with a fresh NH₄NO₃ solution to give NH₄-rho.

A 7 g sample of NH₄-rho prepared as described above was placed in a quartz tube in a vertically mounted tube furnace and calcined under flowing 2NH₃:N₂ (2 parts NH₃: 1 part N₂, by volume) by raising the temperature 60°/hour to 600° and then heating at 600° for 10 hours. The resulting material was cooled under this mixture.

This material was evaluated for catalytic selectivity substantially according to the procedure described in results obtained are set forth in Table VIII.

EXAMPLE 29 AND COMPARISON L

A 15 g sample of NH₄-rho prepared as described above was placed in a quartz tube in a vertically mounted tube furnace and calcined under flowing NH₃ by raising the temperature to 550° and then heating at 550° for 16 hours. The resulting material was cooled under flowing NH₃.

This material was evaluated for catalytic selectivity substantially as described in Example 1 above. The conditions employed and the results obtained are set forth in Table VIII.

In Comparison L, a 15 g sample of NH₄-rho prepared as described above was placed in a quartz tube in a vertically mounted tube furnace and calcined under flowing He passed through water at 25° by raising the temperature to 550° and then heating at 550° for 16 hours. The resulting material was cooled under flowing He passed through water at 25°.

This material was evaluated for catalytic selectivity substantially according to the procedure described in Example 1 above. The conditions employed and the results obtained are set forth in Table VIII.

TABLE VIII

| | Effect of Calcinations in a Vertical Furnace Upon Selectivity of Zeolite H—rho for Methylamines | | | | | | | |
|---|---|---|---|---|---|---|---|---|
| Ex/ Comp | Atm | Treatment Temp (°C.) | R × N Temp (°C.) | Feed Flow (mL/h) | MeOH- Conv. (%) | MeOH—Ma Conv. (%) | Selectivity (%) | | |
| | | | | | | | MMA | DMA | TMA |
| 28 | 2NH₃—N₂ | 600 | 325 | 10 | 92 | 89 | 17 | 73 | 10 |
| K | N₂ | 600 | 300 | 10 | 90 | 86 | 14 | 66 | 20 |
| | He/25 torr H₂O | 550 | 300 | 6 | 89 | 87 | 14 | 47 | 40 |
| | NH₃ | 550 | 300 | 6 | 91 | 86 | 13 | 73 | 13 |

We claim:

1. A process for producing dimethylamine, comprising contacting methanol and/or dimethylether and ammonia, in amounts sufficient to provide a carbon/nitrogen (C/N) ratio from about 0.2 to about 1.5 and at a reaction temperature from about 250° to about 450° C., in the presence of a catalytic amount of an acidic zeolite rho, an acidic zeolite ZK-5, or a mixture thereof;

said acidic zeolite rho having been prepared by calcining zeolite NH₄-rho or H-rho at a temperature of from about 475° C. to about 825° C. in the presence of steam, wherein the gass volume ratio of steam to the total amount of ammonia and inert gas present is at least about 0.01; and said acidic zeolite ZK-5 having been prepared by calcining zeolite NH$_4$-ZK-5 or H-ZK-5 at a temperature of from about 325° C. to about 750° C. in teh presence of steam, wherein the gas volume ratio of steam to the total amount of ammonia and inert gas present is at least about 0.01.

2. A process according to claim 1, conducted at a pressure from about 7 to about 7000 kPa and at a reactant feed rate suffcient to provide a methanol/DME space time of from about 0.01 to about 80 hours.

3. A process according to claim 2, wherein the reaction temperature is from about 300° C. to about 400° C.

4. A process according to claim 3, wherein the pressure is from aobut 70 to about 3000 kPa, and the methanol/DME space time is from about 0.10 to about 1.5 hours.

5. A process according to claim 4, wherein the C/N ratio is from about 0.5 to about 1.2.

6. A process according to claim 1, wherein the acidic zeolite catlayst is acidic zeolite rho.

7. A process according to claim 6, wherein the acidic zeolite rho is prepared by calcination of NH$_4$-rho or H-rho in steam or in steam mixed with ammonia and/or an inert gas.

8. A process according to claim 7, wherein the acidic zeolite rho is prepared by calcination of NH$_4$-rho or H-rho under shallow-bed conditions in flowing steam or in a flowing mixture of steam and ammonia and/or an inert gas.

9. A process according to claim 8, wherein the acidic zeolite rho is prepared at a calcination temperature of from about 500° C. to about 650° C.

10. A process according to claim 7, wherein the acidic zeolite rho is prepared by calcination of NH$_4$-rho under deep-bed conditions in self-generated steam and ammonia.

11. A process according to claim 6, conducted at a pressure from about 7 to about about 7000 kPa and at a reactant feed rate sufficient to provide a methanol/DME space time of from about 0.01 to about 80 hours.

12. A process according to claim 11, wherein the reaction temperature is from about 300° C. to about 400° C.

13. A process according to claim 12, wherein the pressure is from about 70 to about 3000 kPa, and the methanol/DME space time is from about 0.10 to about 1.5 hours.

14. A process according to claim 13, wherein the C/N ratio is from about 0.5 to about 1.2.

15. A process according to claim 1, wherein the acidic zeolite catalyst is acidic zeolite ZK-5.

16. A process according to claim 15, wherein the acidic zeolite ZK-5 is prepared by calcination of NH$_4$-ZK-5 or H-ZK-5 in steam or in steam mixed with ammonia and/or an inert gas.

17. A process according to claim 16, wherein the acidic zeolite ZK-5 is prepared by calcination of NH$_4$-ZK-5 or H-ZK-5 under shallow-bed conditions in flowing steam or in a flowing mixture of steam and ammonia and/or an inert gas.

18. A process according to claim 17, wherein the acidic zeolite ZK-5 is prepared at a calcination temperature of from about 350° C. to about 600° C.

19. A process according to claim 16, wherein the zeolite H-ZK-5 is prepared by calcination of NH$_4$-ZK-5 under deep-bed conditions in self-generated steam and ammonia.

20. A process according to claim 15, conducted at a pressure from about 7 to about 7000 kPa and at a reactant feed rate sufficient to provide a methanol/DME space time of from about 0.01 to about 80 hours.

21. A process according to claim 20, wherein the reaction temperature is from about 300° C. to about 400° C.

22. A process according to claim 21, wherein the pressure is from about 70 to about 3000 kPa, and the methanol/DME space time is from about 0.10 to about 1.5 hours.

23. A process according to claim 22, wherein the C/N ratio is from about 0.5 to about 1.2.

* * * * *